United States Patent
Migneco et al.

(10) Patent No.: US 11,440,791 B2
(45) Date of Patent: Sep. 13, 2022

(54) SEAT CUSHION DESIGN MANUFACTURING

(71) Applicant: Lear Corporation, Southfield, MI (US)

(72) Inventors: Francesco Migneco, Salene, MI (US); David Gallagher, Sterling Heights, MI (US); Sajad Arabnejad, Southfield, MI (US); Mark Weaver, Auburn Hills, MI (US)

(73) Assignee: Lear Corporation, Southfield, MI (US)

( * ) Notice: Subject to any disclaimer, the term of this patent is extended or adjusted under 35 U.S.C. 154(b) by 321 days.

(21) Appl. No.: 16/253,634

(22) Filed: Jan. 22, 2019

(65) Prior Publication Data

US 2020/0231428 A1    Jul. 23, 2020

(51) Int. Cl.
| | |
|---|---|
| *B68G 7/00* | (2006.01) |
| *A47C 7/18* | (2006.01) |
| *A47C 7/02* | (2006.01) |
| *B29C 64/10* | (2017.01) |
| *B33Y 50/00* | (2015.01) |
| *B60N 2/70* | (2006.01) |
| *G01L 5/16* | (2020.01) |

(52) U.S. Cl.
CPC ............... *B68G 7/00* (2013.01); *A47C 7/029* (2018.08); *A47C 7/18* (2013.01); *B29C 64/10* (2017.08); *B33Y 50/00* (2014.12); *B60N 2/7017* (2013.01); *G01L 5/16* (2013.01)

(58) Field of Classification Search
CPC .......... B68G 7/00; B33Y 50/00; B33Y 10/00; B29C 64/10; A47C 7/18; A47C 7/029; A47C 31/126; B60N 2/7017; B60N 2/60; B60N 2/62; B60N 2/7035; G01L 5/16
See application file for complete search history.

(56) References Cited

U.S. PATENT DOCUMENTS

| | | | | |
|---|---|---|---|---|
| 3,155,363 | A | * | 11/1964 | Lohr ................... B60N 2/0232 |
| | | | | 248/419 |
| 9,283,875 | B1 | * | 3/2016 | Pellettiere .......... B64D 11/0647 |
| 2011/0241404 | A1 | | 10/2011 | Di Giusto et al. |
| 2016/0229126 | A1 | | 8/2016 | Every et al. |

(Continued)

FOREIGN PATENT DOCUMENTS

| | | |
|---|---|---|
| CN | 101448437 A | 6/2009 |
| CN | 203283070 U | 11/2013 |

(Continued)

OTHER PUBLICATIONS

Jaehong, Jeon KR-200207612-Y1 Machine Translation (Year: 2001).*

(Continued)

*Primary Examiner* — Lee A Holly

(74) *Attorney, Agent, or Firm* — Brooks Kushman P.C.

(57) ABSTRACT

A method for manufacturing a seat cushion receives data of a specific occupant. A seat cushion is designed from the occupant data. The seat cushion is provided with a cellular structure from the occupant data. Another method for manufacturing a seat cushion receives boundary conditions for a seat cushion. Applicable mechanical properties are determined for the boundary conditions of the seat cushion. Applicable thermal properties are determined for the boundary conditions of the seat cushion. A seat cushion is designed with a varying cellular structure to satisfy the applicable mechanical properties and the applicable thermal properties.

10 Claims, 3 Drawing Sheets

(56) References Cited

U.S. PATENT DOCUMENTS

| | | | | |
|---|---|---|---|---|
| 2017/0001548 A1* | 1/2017 | Iwakata | ............... | B60N 2/289 |
| 2018/0312086 A1 | 11/2018 | Meingast et al. | | |
| 2018/0361896 A1* | 12/2018 | White | ............... | B29B 11/14 |
| 2019/0047844 A1* | 2/2019 | Tillner | ............... | B60N 2/70 |
| 2019/0061581 A1* | 2/2019 | White | ............... | B60R 21/207 |
| 2019/0351787 A1* | 11/2019 | Lodhia | ............... | B60N 2/0244 |
| 2020/0198508 A1* | 6/2020 | Arata | ............... | B60N 2/70 |

FOREIGN PATENT DOCUMENTS

| | | | | |
|---|---|---|---|---|
| DE | 10340559 A1 | 3/2005 | | |
| DE | 102016225837 A1 | 6/2018 | | |
| ES | 2335962 A1 * | 4/2010 | ............ | A47C 27/148 |
| JP | 2000333790 A | 12/2000 | | |
| KR | 200207612 Y1 * | 1/2001 | | |
| WO | 2014014977 A2 | 1/2014 | | |
| WO | WO-2020116327 A1 * | 6/2020 | ............ | B29C 64/393 |

OTHER PUBLICATIONS

Yamaguchi, Yukikko WO-2020116327-A1 Machine Translation (Year: 2018).*
Marco Lopez Jose Manuel, ES-2335962-A1 Machine translation (Year: 2010).*
German Office Action for Application No. 10 2020 200 637.7, dated Oct. 28, 2021, 9 pages.
Chinese Office Action for Application No. 20191111091.3, dated Nov. 30, 2021, 8 pages.
China Office Action for Application No. 201911110091.3, dated Jun. 6, 2022, 16 pages.

\* cited by examiner

SEAT CUSHION DESIGN MANUFACTURING

TECHNICAL FIELD

Various embodiments relate to seat cushions and methods for manufacturing seat cushions.

BACKGROUND

The prior art has provided seat assemblies with frames, cushions, and trim covers.

SUMMARY

According to an embodiment, a method for manufacturing a seat cushion receives data of a specific occupant. A seat cushion is designed from the occupant data. The seat cushion is provided with a cellular structure from the occupant data.

According to a further embodiment, the seat cushion is manufactured from the occupant data.

According to an even further embodiment, the seat cushion is manufactured as a seat bun.

According to another even further embodiment, the seat cushion is manufactured as a seat back.

According to another even further embodiment, the seat cushion is manufactured as a head restraint.

According to another further embodiment, the occupant data is received as a pressure distribution.

According to another further embodiment, the occupant data is received as anthropometric data.

According to another further embodiment, the seat cushion is manufactured from three-dimensional printing.

According to another further embodiment, the seat cushion is assembled directly to a seat frame.

According to another further embodiment, the seat cushion is assembled directly to a seat frame without an additional spring wire.

According to another further embodiment, the seat cushion is assembled directly to a seat frame without an additional seat pan.

According to another embodiment, a seat cushion is manufactured from a method that receives data of a specific occupant. A seat cushion is designed from the occupant data. The seat cushion is provided with a cellular structure from the occupant data.

According to another embodiment, a seat cushion is provided with a cellular structure with a contact surface formed to accommodate data of a specific occupant.

According to another embodiment, a method for manufacturing a seat cushion receives boundary conditions for a seat cushion. Applicable mechanical properties are determined for the boundary conditions of the seat cushion. Applicable thermal properties are determined for the boundary conditions of the seat cushion. A seat cushion is designed with a varying cellular structure to satisfy the applicable mechanical properties and the applicable thermal properties.

According to a further embodiment, the seat cushion is three-dimensionally printed.

According to an even further embodiment, cutting of the seat cushion after printing is eliminated.

According to an even further embodiment, increasing tolerances is eliminated.

According to another further embodiment, applicable mechanical properties of stress are determined for the boundary conditions of the seat cushion.

According to another further embodiment, the seat cushion is designed with attachment components.

According to another embodiment, a seat cushion is manufactured from a method that receives boundary conditions for a seat cushion. Applicable mechanical properties are determined for the boundary conditions of the seat cushion. Applicable thermal properties are determined for the boundary conditions of the seat cushion. A seat cushion is designed with a varying cellular structure to satisfy the applicable mechanical properties and the applicable thermal properties. The seat cushion is three-dimensionally printed.

According to another embodiment, a seat assembly is provided with a seat frame. A seat cushion is manufactured from a method that receives boundary conditions for a seat cushion. Applicable mechanical properties are determined for the boundary conditions of the seat cushion. Applicable thermal properties are determined for the boundary conditions of the seat cushion. A seat cushion is designed with a varying cellular structure to satisfy the applicable mechanical properties and the applicable thermal properties. The seat cushion is three-dimensionally printed. The seat cushion is mounted to the frame. A trim cover is provided over the seat cushion.

According to an embodiment, a seat cushion is provided with a first seat cushion layer with a first cellular structure with a first stress arrangement and with first thermal properties. A second seat cushion layer is adjacent the first cushion layer with a second cellular structure with a second stress arrangement different than the first stress arrangement, and with second thermal properties different than the first thermal properties.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
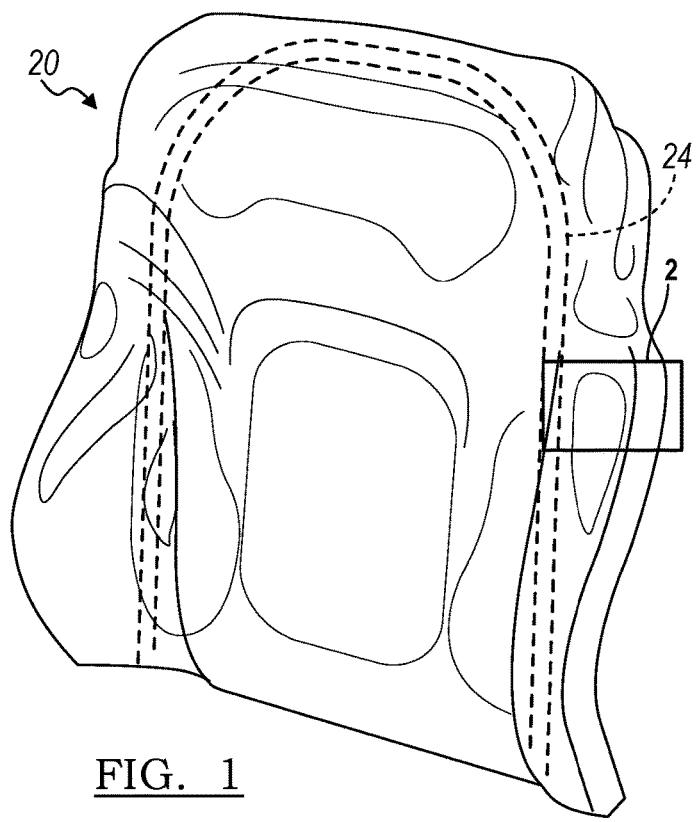
FIG. 1 is a front perspective view of a seat cushion according to an embodiment.

FIG. 1 illustrates a seat cushion according to an embodiment and referenced generally by numeral 20. The seat cushion 20 is a customized shell for a seat back of a seat assembly. The seat assembly may be a vehicle seat, office chair, comfort furniture, or the like. The seat cushion 20 is designed for a specific occupant and is formed from a rapid manufacturing process with an optimization of a topology of a microstructure of the seat cushion 20 for the customized design.

For the depicted embodiment, the seat cushion 20 is a shell for a seat back. The seat cushion 20 may also be formed as a seat bun to replace a conventional foam bun. The seat cushion 20 may also be formed as a head restraint. The seat cushion 20 may be formed to replace a conventional foam pad, a trim cover foundation or both of the foam pad and the trim cover foundation. The seat cushion 20 may be formed from foam, or from any suitable material for the applicable structural and/or comfort specifications.

Figure 2:
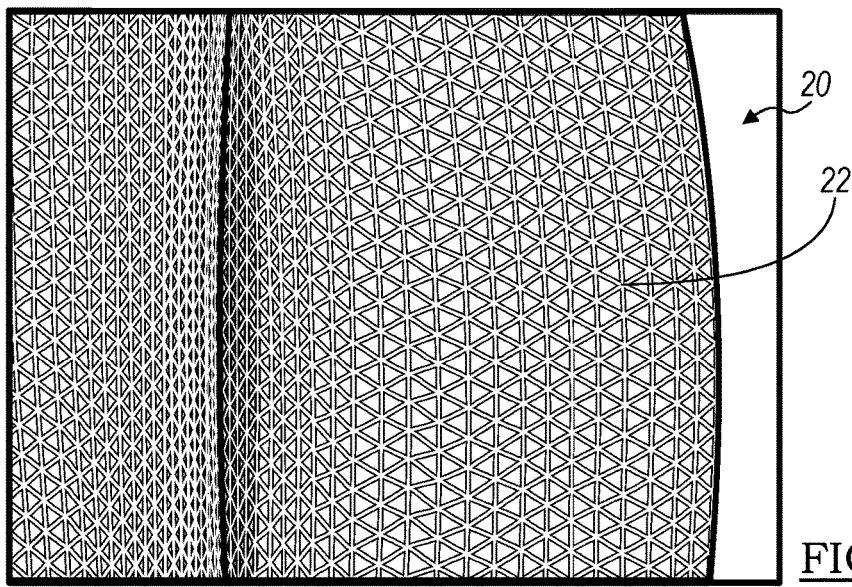
FIG. 2 is an enlarged front perspective view of a portion of the seat cushion of FIG. 1.

FIG. 2 illustrates a portion of the seat cushion 20 enlarged for greater detail. The seat cushion 20 includes a cellular microstructure with a plurality of interconnected webs 22 with open space between the webs 22. The thickness of the webs 22, and consequently, the space between the webs 22, varies as a function of the optimized topology, ranging from a microstructure on the right side of FIG. 2 to a macrostructure on the left side of FIG. 2. The design control of the open spaces between the webs 22 also controls visco-elastic properties of the seat cushion 20 for passage of air during compression and expansion of the seat cushion 20 for damping characteristics of the seat cushion 20. Visco-elastic properties are employed for the design and optimization of the headrest seat cushions 20.

Figure 3:
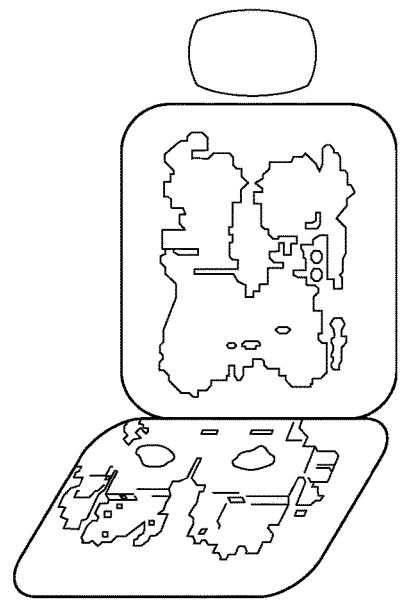
FIG. 3 is a front perspective schematic view of a pressure distribution upon a seat assembly according to an embodiment.
Figure 4:
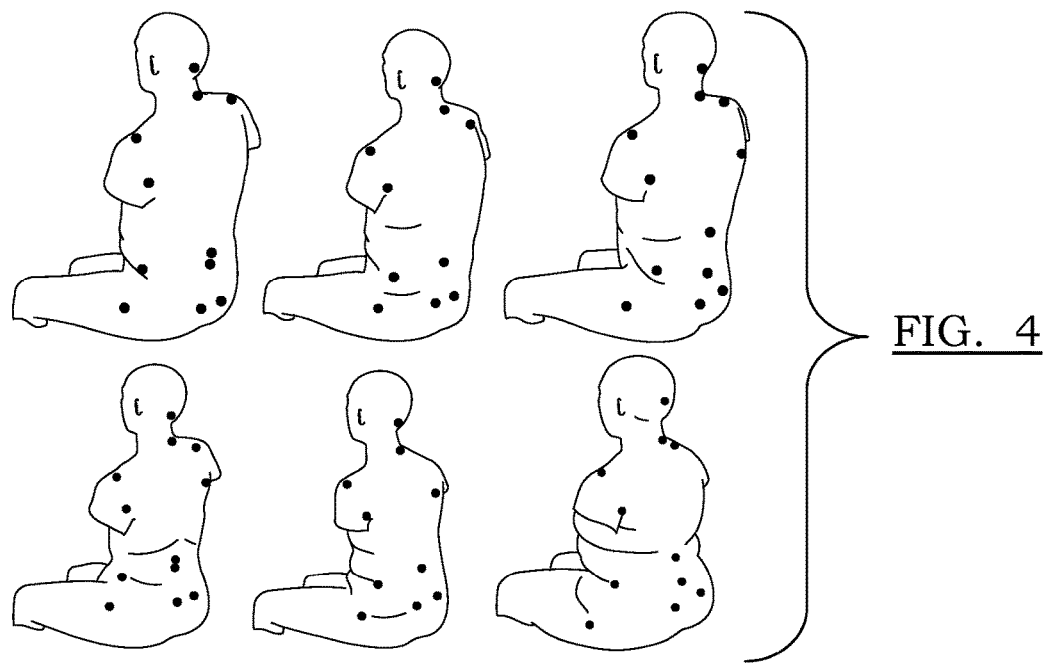
FIG. 4 is a rear perspective view of a plurality of occupants according to an embodiment.

The seat cushion 20 is customized for a specific occupant. Referring now to FIG. 3, a pressure distribution of a specific occupant is the illustrated. The occupant-specific pressure points are collected by a pressure mat or an equivalent mapping sensor array. The pressure points are measured across a seat bottom, a seat back, and a head restraint. FIG. 4 illustrates a plurality of bodies with various genders, shapes and sizes with an array of anatomical parameters upon the bodies. Anthropometric data is collected for the occupant by taking measurements, such as with a surface scanner.

The loading profiles (FIG. 3) and the anatomical parameters (FIG. 4) of the occupant may be measured at a car dealership, at an occupant's home, or the like. The anatomical measurements may be image-based and digitized, by use of a hand-held device as known in the art. The anatomical and loading data is employed to design a seat assembly and the associated seat cushions, such as the seat cushion 20, to fit the anatomy and comfort constraints of the specific occupant.

The seat cushions 20 can be of standard size, such as a seat-specific size, with mechanical features, such as microstructures and macrostructures and contact surfaces, optimized for the individual occupant. Alternatively, seat cushions 20 may be fabricated for different ranges of occupants. The seat cushions 20 may also be designed entirely to include all the geometric features and the mechanical features to match the occupant anatomy and load profile. The material of the seat cushion 20 may be polymeric and/or metallic, or any suitable resilient structure material. The cellular microstructure and macrostructure is designed to provide optimized mechanical properties, including, but not limited to, viscoelastic-like reaction properties.

Figure 5:
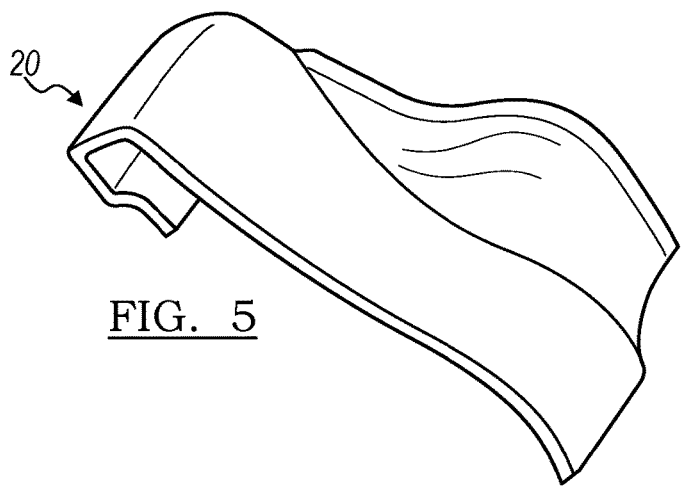
FIG. 5 is a front perspective view of the seat cushion of FIG. 1, illustrated during a design step, according to an embodiment.
Figure 6:
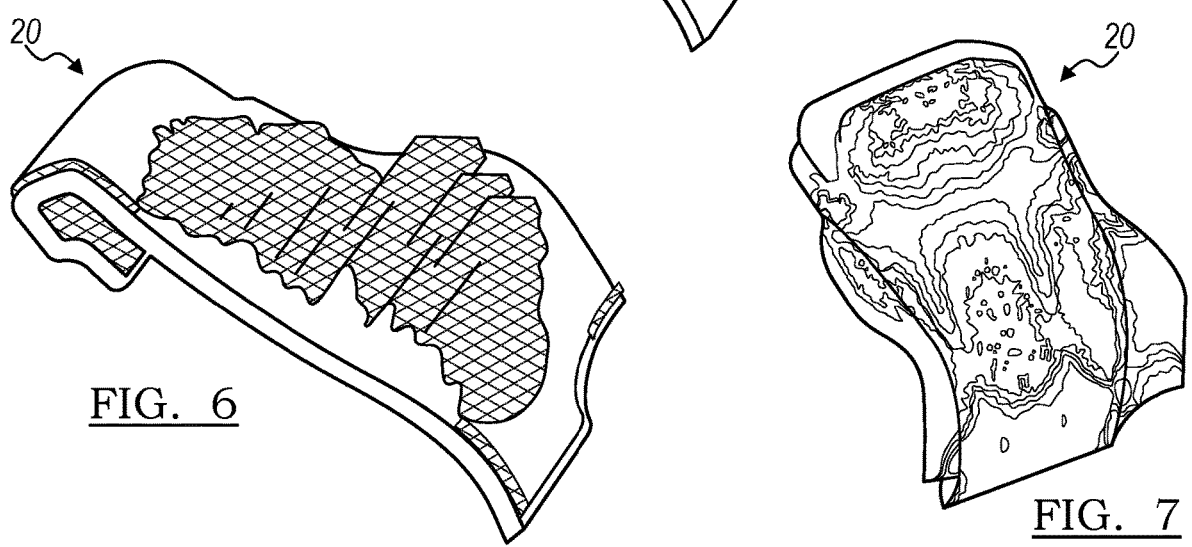
FIG. 6 is a front perspective view of the seat cushion of FIG. 1, illustrated during another design step, according to an embodiment.
Figure 7:
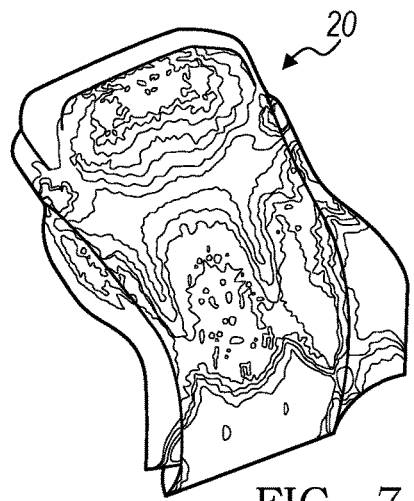
FIG. 7 is a front perspective view of the seat cushion of FIG. 1, illustrated during another design step, according to an embodiment.

FIG. 5 illustrates a computerized image, or a computer-aided design (CAD) image of a shell for the seat cushion 20. The CAD design may be an anatomical match for the specific occupant, or may be a standard, seat-specific design. In FIG. 6, the pressure profile of the specific occupant is applied to the seat cushion 20. In FIG. 7, a topology optimization is applied by utilizing finite element analysis (FEA).

The CAD image of the seat cushion 20 is created based on the anatomical features of the occupant, and by using an appropriate software. The design of the seat cushion 20 is optimized to include a porous cellular structure that matches the loading boundary condition determined by the pressure mat. Alternatively, rather than creating the anatomically correct seat cushion 20, a seat-specific, standard part which is then optimized for loads only.

Referring again to FIGS. 1 and 2, the seat cushion 20 is manufactured from the CAD data by a rapid manufacturing process, such as three-dimensional printing. This manufacturing process permits the seat cushion 20 to be completely customized to the occupant, and the mechanical properties are adjusted to conform to the occupant. The rapid manufacturing may utilize stereolithography (SLA) three-dimensional printing; selective laser sintering (SLS) three-dimensional printing; fused filament fabrication (FFF) including fused deposition modeling (FDM® of Stratasys, Inc.); three-dimensional knitting using a variety of materials for three-dimensional printing and yarns for three-dimensional knitting; or the like.

Due to the flexibility offered by three-dimensional printing, the seat cushion 20 may also incorporate any pockets, channels 24, cavities, voids, extrusions or the like to interface with the seat structure and trim. Features such as the channel 24 permit the seat cushion 20 to assembled directly to a frame of the seat assembly.

The seat cushion 20 may be manufactured efficiently and cost effectively. The seat cushion 20 may eliminate foam cushions from the associated seat assembly. The high level of occupant specific customization increases comfort and safety. The visco-elastic properties of the cellular microstructure and macrostructure provide damping and impact absorption characteristics. The visco-elastic properties are utilized for the headrest seat cushion 20 design. The seat cushion 20 may be formed from materials such as metal wire that is more resilient than foam and may allow for the omission of additional spring suspension wires and a seat pan within the seat assembly. The optimized structural design may also permit a smaller and more compact seat assembly.

Three-dimensional printing is efficient and an effective manufacturing process. Three-dimensional printing permits a trim foundation with enhanced thermal properties and with customized mechanical properties. The trim foundation is conventionally a layer of a thin foam attached to trim cover for engaging the trim cover and the seat cushion, such as the seat back, foam bun and/or head restraint. In the context of vehicle seating, specifications are set forth for each seat assembly, which may be specific to a particular vehicle and/or a particular vehicle seat assembly. The flexibility of this manufacturing process permits a design of an automotive seat foundation to match mechanical properties specified for the particular seating application, while also modifying intrinsic thermal properties and/or an absolute thickness of the seat cushion 20. The structure of the foundation of the seat cushion 20 may be designed by using advanced custom software that optimizes the microstructure and the macrostructure of the foundation of the seat cushion 20.

Figure 8:
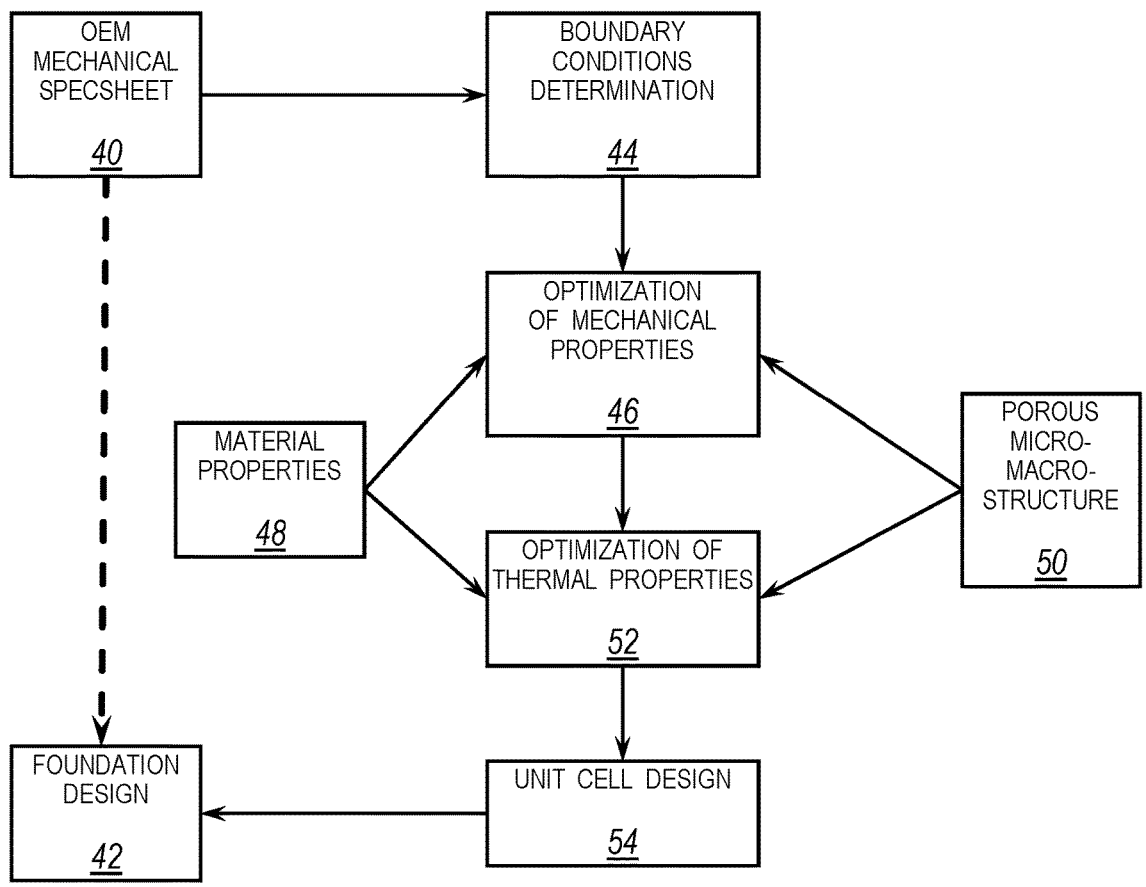
FIG. 8 is a schematic system diagram of a method for manufacturing a seat cushion according to an embodiment of a foundation design.

Referring now to FIG. 8, a schematic system diagram for a method for manufacturing a seat cushion with a foundation design, such as the seat cushion 20 according to another embodiment, is illustrated. At step 40 an original equipment manufacturer (OEM) provides a mechanical specification sheet for a vehicle seat assembly. The specification sheet defines specifications for the resulting seat assembly, including a foundation design at step 42.

At step 44, boundary conditions are determined from the mechanical specification sheet. The boundary conditions set the ranges in which the foundation design 42 will satisfy the mechanical specifications. At step 46, an optimization of mechanical properties is performed for the boundary conditions of step 44. The mechanical properties may include desired mechanical properties, such as modulus, yield strength, geometric stiffness, and the like. The optimization of mechanical properties may consider the applicable stress, tension and/or compression, of the seat cushion under applicable loading, while controlling the thickness of the seat cushion.

The optimization of the mechanical properties at block 46 considers the material properties of the seat cushion material at block 48. These steps 46, 48 take into consideration the structural properties of the associated material. The optimization of the mechanical properties at block 46 also considers the porous microstructures and macrostructures (block 50) available for the applicable manufacturing process of the material properties of step 48.

At block 52, an optimization of thermal properties is performed for the boundary conditions determined at block 44. The thermal properties affect any heating and or cooling of the associated seat assembly. The optimization of thermal properties at step 52 also considers the material properties of step 48, such as thermal conductivity. The optimization of thermal properties at step 52 also factors in the available porous microstructures and macrostructures of step 50 to find an applicable fluid flow rate through the seat cushion.

The porous micro-structure and macro-structure is computed based on arbitrary mechanical as well as thermal constraints to match automotive grade requirements for the trim cover foundation. Pores can be highly organized in space, completely random or a combination thereof. The designed porous structure is further refined to optimize thermal properties (thermal conductivity, transfer, flux, and the like) and/or overall thickness.

Figure 9:
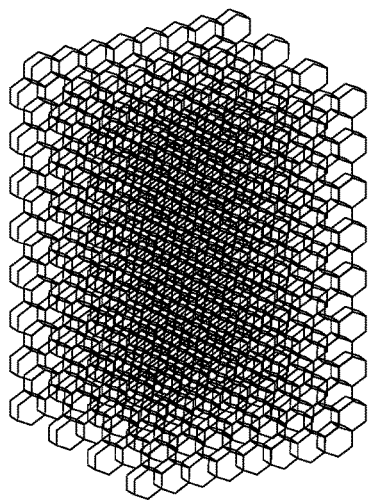
FIG. 9 is a perspective view of a cellular structure for a seat cushion according to an embodiment.
Figure 10:
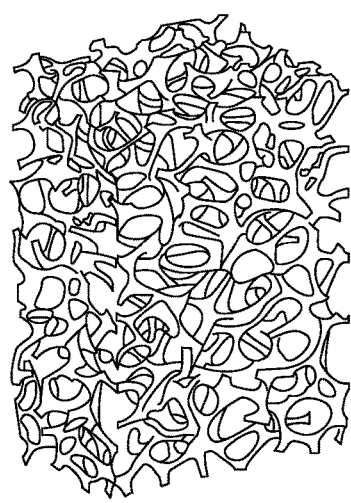
FIG. 10 is a perspective view of a cellular structure for a seat cushion according to another embodiment.
Figure 11:
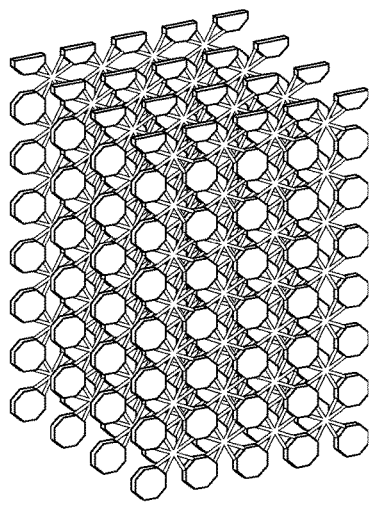
FIG. 11 is a perspective view of a cellular structure for a seat cushion according to another embodiment.

At step 54, a unit cell design is determined for each region of the seat to develop the foundation design of step 42. The unit cell design for each region may vary in cellular structure to meet the optimized mechanical and thermal properties. Examples for cellular structure design include flexibility and porosity as depicted in FIG. 9; rigidity and porosity in FIG. 10; and rigidity and limited porosity in FIG. 11.

The foundation design of step 42 is developed with varying cellular structures to accommodate varying structural and thermal requirements. The foundation design of step 42 is then manufactured by a rapid manufacturing process, such as three-dimensional printing or any other suitable rapid manufacturing process such as those disclosed in the prior embodiment. The foundation design is manufactured as a single component with varying microstructures and macrostructures. The cellular structure designs can be created directly from set pattern file geometry, thereby eliminating production processes such as cutting for assembly. Also increasing tolerance stack ups can be eliminated by manufacturing the seat cushion as one component with varying cellular structures.

The rapid manufacturing process permits the seat cushion to be fabricated to include trench arrows or the like, allowing tighter tolerances and unique, customized designs. The overall shape can be customized for any seat requirements. The seat cushion can be assembled directly to a seat frame; and a trim cover is provided over the seat cushion.

Any number of surfaces of the seat cushion may contact a B-side (concealed) surface of an associated trim component, and an A-side surface of the foam, respectively. The seat cushion may be formed with a thin skin with a variable thickness in a range of one hundred micrometers (μm) to three millimeters (mm), which is three-dimensionally printed with the main porous structure. This manufacturing process provides a seat cushion that feels both plushy and soft in comparison to foam, while compactly satisfying all of the defined specifications.

The optimized seat cushion, including the trim foundation, boosts and optimizes seat heating and cooling. The ability to design the seat cushion with non-uniform mechanical properties allows for exotic seat geometries that are currently not achievable with most materials. The rapidly manufactured seat cushion permits a thinner foundation with the same compressibility of a thicker traditional foam foundation.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for manufacturing a seat cushion, the method comprising:
   receiving data of a specific occupant;
   designing a seat cushion from the occupant data, with channels to be assembled directly to a seat frame;
   manufacturing the seat cushion by three-dimensional printing the seat cushion with a cellular structure from the occupant data, with the channels; and
   assembling the seat cushion directly to the seat frame by installing the seat frame into the seat cushion channels.

2. The method of claim 1 further comprising a step of manufacturing the seat cushion as a seat bun or a seat back.

3. The method of claim 1 further comprising a step of manufacturing the seat cushion as a head restraint.

4. The method of claim 1 further comprising a step of receiving the occupant data as a pressure distribution.

5. The method of claim 1 further comprising a step of receiving the occupant data as anthropometric data.

6. The method of claim 1 further comprising assembling the seat cushion directly to a seat frame without an additional spring wire.

7. The method of claim 1 further comprising assembling the seat cushion directly to a seat frame without an additional seat pan.

8. The method of claim 1 further comprising manufacturing the seat cushion from metal wire.

9. The method of claim 1 further comprising providing the seat cushion with visco-elastic properties to provide damping and impact absorption to omit an additional suspension.

10. A method for manufacturing a seat cushion, the method comprising:
   receiving data of a specific occupant;
   designing a seat cushion from the occupant data;
   manufacturing the seat cushion by three-dimensional printing the seat cushion from metal wire with a cellular structure from the occupant data; and
   assembling the seat cushion directly to a seat frame.

* * * * *